(12) United States Patent
Miyahara et al.

(10) Patent No.: US 7,293,755 B2
(45) Date of Patent: Nov. 13, 2007

(54) VIBRATION ISOLATION DEVICE

(75) Inventors: Tetsuya Miyahara, Wako (JP); Katsuhisa Yano, Inuyama (JP); Eiji Tanaka, Komaki (JP)

(73) Assignees: Honda Motor Co., Ltd., Tokyo (JP); Tokai Rubber Industries, Ltd., Aichi-ken (JP)

( * ) Notice: Subject to any disclaimer, the term of this patent is extended or adjusted under 35 U.S.C. 154(b) by 60 days.

(21) Appl. No.: 11/267,051

(22) Filed: Nov. 4, 2005

(65) Prior Publication Data

US 2006/0091281 A1 May 4, 2006

(30) Foreign Application Priority Data

Nov. 4, 2004 (JP) ............................ P2004-321294

(51) Int. Cl.
*F16M 13/00* (2006.01)
(52) U.S. Cl. ...................... 248/562; 248/566; 248/560; 248/571; 248/603; 267/140.13
(58) Field of Classification Search ................ 248/562, 248/566, 560, 571, 603; 267/140.11, 140.13–140.15, 267/141.1–141.4
See application file for complete search history.

(56) References Cited

U.S. PATENT DOCUMENTS

| | | | | | |
|---|---|---|---|---|---|
| 1,880,181 | A | * | 9/1932 | Turner | 248/599 |
| 1,937,581 | A | * | 12/1933 | Lord | 248/612 |
| 2,389,562 | A | * | 11/1945 | Storch | 248/613 |
| 4,629,154 | A | * | 12/1986 | Kataczynski | 248/610 |
| 4,632,372 | A | * | 12/1986 | Nakajima et al. | 267/140.11 |
| 4,762,309 | A | * | 8/1988 | Hutchins | 267/140.13 |
| 4,826,126 | A | * | 5/1989 | Katayama et al. | 248/562 |
| 4,880,215 | A | * | 11/1989 | Katayama et al. | 267/140.13 |
| 4,896,867 | A | * | 1/1990 | Schyboll et al. | 267/140.13 |
| 4,901,986 | A | * | 2/1990 | Smith | 267/140.14 |
| 4,921,201 | A | * | 5/1990 | Jouade | 267/140.13 |
| 5,024,461 | A | * | 6/1991 | Miyakawa et al. | 267/140.13 |
| 5,242,158 | A | * | 9/1993 | Robic et al. | 267/140.14 |
| 5,273,262 | A | * | 12/1993 | Baldini et al. | 267/140.13 |
| 5,295,672 | A | * | 3/1994 | Gugsch | 267/140.13 |
| 5,318,283 | A | * | 6/1994 | Weltin et al. | 267/140.14 |

(Continued)

FOREIGN PATENT DOCUMENTS

DE 3712656 A1 * 11/1987

(Continued)

*Primary Examiner*—Carl D. Friedman
*Assistant Examiner*—Michael McDuffie
(74) *Attorney, Agent, or Firm*—Carrier, Blackman & Associates, P.C.; Joseph P. Carrier; William D. Blackman

(57) ABSTRACT

A vibration isolation device includes two attachment members inter-connected by an elastic member. One of the attachment members comprises a metal tubular member connected to the elastic member, a metal bracket in which the metal tubular member is press-fitted, and a plastic bracket supporting the metal bracket and adapted to be attached to a support body or a vibratory source. The metal bracket has an engagement portion press-fitted with the metal tubular member, and a non-engagement portion offset from the engagement portion in a radial outward direction and held out of press-fitted engagement with the metal tubular member, the non-engagement portion being connected to the plastic bracket with a second elastic member disposed therebetween.

15 Claims, 8 Drawing Sheets

U.S. PATENT DOCUMENTS

| | | | |
|---|---|---|---|
| 5,340,093 A * | 8/1994 | Rudolph | 267/219 |
| 5,398,907 A * | 3/1995 | Kelchner | 248/634 |
| 5,700,000 A * | 12/1997 | Wolf et al. | 267/140.13 |
| 5,707,047 A * | 1/1998 | Meyering et al. | 267/140.13 |
| 5,927,698 A * | 7/1999 | Miyoshi et al. | 267/140.13 |
| 5,947,455 A * | 9/1999 | Mikasa et al. | 267/140.13 |
| 5,988,611 A * | 11/1999 | Takashima et al. | 267/140.13 |
| 6,036,183 A * | 3/2000 | Lee et al. | 267/140.14 |
| 6,371,462 B2 * | 4/2002 | Gennesseaux | 267/140.13 |
| 6,523,816 B1 * | 2/2003 | Gastineau et al. | 267/140.14 |
| 6,536,113 B2 * | 3/2003 | Guillemot | 29/896.93 |
| 6,592,110 B2 * | 7/2003 | Takashima et al. | 267/140.13 |

FOREIGN PATENT DOCUMENTS

| | | |
|---|---|---|
| JP | 08-247208 | 9/1996 |
| JP | 09-177866 | 7/1997 |
| JP | 2001-050331 | 2/2001 |

* cited by examiner

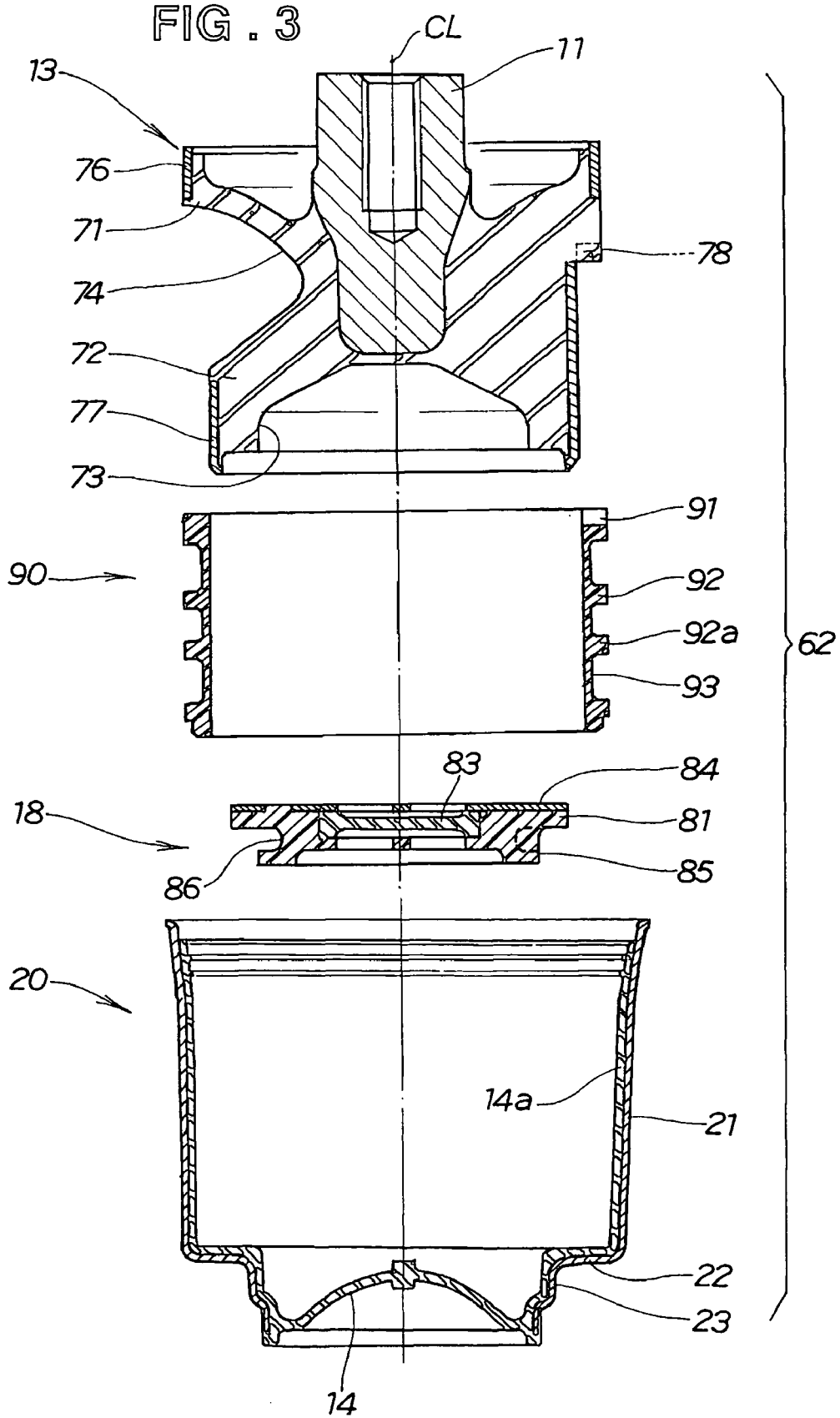

VIBRATION ISOLATION DEVICE

FIELD OF THE INVENTION

The present invention relates to a vibration isolation device used for mounting a vibratory source to a support body.

BACKGROUND OF THE INVENTION

There are known various types of vibration isolation devices, which are so designed as to absorb vibration generated from a vibratory source such as an engine, thereby suppressing transmission of the vibration to a support body on which the vibrator source is mounted. One example of such known vibration isolation devices takes the form of a liquid-filled vibration isolation device, which comprises a first attachment member adapted to be attached to an engine as a vibratory source, a second attachment member of tubular shape adapted to be attached to a support body, an elastic member such as rubber interconnecting the first and second attachment members, and a diaphragm mounted to the second attachment member so as to define, together with the elastic member, a liquid chamber. A partition member is mounted to separate the liquid chamber into a main compartment and an auxiliary compartment that communicate with each other via an orifice. By virtue of the effect of a restricted flow produced when a working fluid passes through the orifice between the main compartment and the auxiliary compartment, vibration generated from the engine can effectively suppressed before being transmitted to the support body.

In recent years there has been an increasing demand for a lightweight and inexpensive vibration isolation device. To meet this requirement, a main concern has been addressed to employ a plastic bracket for attachment of the second attachment member to the support body, such as disclosed in Japanese Patent Laid-Open Publications (JP-A) Nos. 8-247208, 9-177866 and 2001-50331.

A vibration isolation device shown in JP 8-247208 A includes a tubular bracket formed from a synthetic resin and connected at one end with an elastic member. A partition member, a diaphragm and a metal cap are fitted in the named order into the tubular bracket from an end opposite to the elastic member. The metal cap is directly press-fitted with the plastic bracket.

In a vibration isolation device shown in JP 9-177866 A, a tubular bracket formed from a synthetic resin is connected to an elastic member and includes a tubular metal bracket member integrally molded as an insert with the plastic bracket when the plastic bracket is formed by injection molding. The metal bracket member is disposed internally of the plastic bracket along substantially the entire axial length of the plastic bracket. A partition member, a diaphragm and a dish-like metal cap are fitted in the named order in the tubular metal bracket from a side opposite to the elastic member, and then an outer end of the metal bracket member is bent in a radial inward direction to clench or hold the partition member, diaphragm and the metal cap. A vibration isolation device shown in JP 2001-50331 A has a similar configuration.

In the vibration isolation device shown JP 8-247208 A, the plastic bracket as it is press-fitted with the metal cap is subjected to an external force acting in a radial outward direction thereof. If such external force is insufficient or excessively small, reliable press-fit engagement between the plastic bracket and the metal cap cannot be achieved. Alternatively, if the external force is excessively large, the plastic bracket may be damaged or broken. To avoid this problem, the plastic bracket and the metal cap both require severe dimensional and quality control, which will incur additional cost and man-hours.

Furthermore, in the vibration isolation devices shown in the above-named three Japanese publications, the partition member, diaphragm and metal cap are assembled in succession into the bracket so as to form a liquid seal assembly. In general the elastic member and the liquid seal assembly vary in specifications depending on the type of a vibratory source with which the vibration isolation device is used, whereas the bracket is used commonly with different types of vibratory sources. It is therefore preferable that a group of elastic members of different specifications and a group of liquid seal assemblies of different specifications are prepared in advance as subassemblies. In an actual application to a particular vibratory source, a suitable one of the elastic members and a suitable one of the liquid seal assemblies each stocked in the form of a subassembly are selected and assembled with a tubular bracket. This arrangement is in fact effective to increase the assembling efficiency and lower the man-hours.

When used in combination with a plastic tubular bracket, the elastic member or the liquid seal assembly that is prepared in the form of a subassembly is preferably assembled by press-fitting operation with the plastic tubular bracket because the press-fitting operation is highly efficient. To ensure reliable engagement between the plastic bracket and the elastic member or the liquid seal assembly, the press-fitting operation requires severe dimensional and quality control of the two parts to be press-fitted, which will incur an increase in the cost and man-hours.

SUMMARY OF THE INVENTION

It is, therefore, an object of the present invention to provide a vibration isolation device which is lightweight, can be assembled through a press-fitting operation used for assembling a subassembly including an elastic member relative to a bracket adapted to be attached to a vibratory source or a support body, and is able to protect a plastic bracket against damage or rupturing which may occur during press-fitting operation.

According to the invention, there is provided a vibration isolation device comprising a first attachment member for attachment to a vibratory source, a second attachment member for attachment to a support body on which the vibratory source is to be mounted via the vibration isolation device, and an elastic member interconnecting the first attachment member and the second attachment member. One of the first attachment member and the second attachment member comprises a metal tubular member connected to the elastic member, a metal bracket in which the metal tubular member is press-fitted, and a plastic bracket supporting the metal bracket and adapted to be attached to the vibratory source or the support body. The metal bracket has an engagement portion press-fitted with the metal tubular member, and a non-engagement portion offset from the engagement portion in a radial outward direction and held out of press-fitted engagement with the metal tubular member, the non-engagement portion being connected to the plastic bracket with a second elastic member disposed therebetween.

With this arrangement, the plastic bracket used for attachment to the vibratory source or the support body can achieve a certain reduction of the overall weight of the vibration isolation device. Furthermore, by virtue of the elastic member disposed between the non-engagement portion of the metal bracket and the plastic bracket, an external force exerted from the metal tubular member to the engagement portion of the metal bracket during press-fitting operation can be effectively absorbed so that the force is not transmitted to the plastic bracket. The plastic bracket is, therefore, substantially protected from damage or rupturing during the press-fitting operation. The elastic member allows the metal tubular member and the metal bracket to have relatively large tolerances, thus enabling highly efficient press-fitting operation and easy control of the dimensions and qualities of the two parts to be press-fitted.

In one preferred form of the invention, the metal bracket and the second elastic member are integrally molded with the plastic bracket such that the non-engagement portion of the metal member is coated with the second elastic member and embedded together therewith in the plastic bracket. This arrangement contributes to reduction of the assembling cost.

The second elastic member may include a first portion coated on the non-engagement portion of the metal bracket and embedded in the plastic bracket, and a second portion integral with the first portion and disposed between the engagement portion of the metal bracket and the plastic bracket. The second portion of the second elastic member provides an enhanced suppressing effect against a force applied to the engagement portion during press-fitting operation. Preferably, the second portion of the second elastic member has a larger thickness than the first portion.

It is preferable that the non-engagement portion has an end bent in a radial direction of the metal bracket so as to form a stopper flange for anchoring the non-engagement portion in position against removal from the plastic bracket.

Preferably, the metal bracket further includes an annular step integral with and extending between the engagement portion and the non-engagement portion of the metal bracket, the annular step lying in a plane perpendicular to an axis of the metal bracket. The thus arranged annular stop provides an additional force-suppressing effect to the metal bracket when the metal bracket and the metal tubular member are press-fitted together.

BRIEF DESCRIPTION OF THE DRAWINGS

Certain preferred structural embodiments of the present invention will be described in detail herein below, by way of example only, with the reference to the accompanying drawings, in which:

FIG. 3 is a further exploded cross-sectional view showing an elastic member, a diaphragm, a partition member, a side partition member and a metal tubular member of the vibration isolation device;

DETAILED DESCRIPTION OF THE PREFERRED EMBODIMENTS

Figure 1:
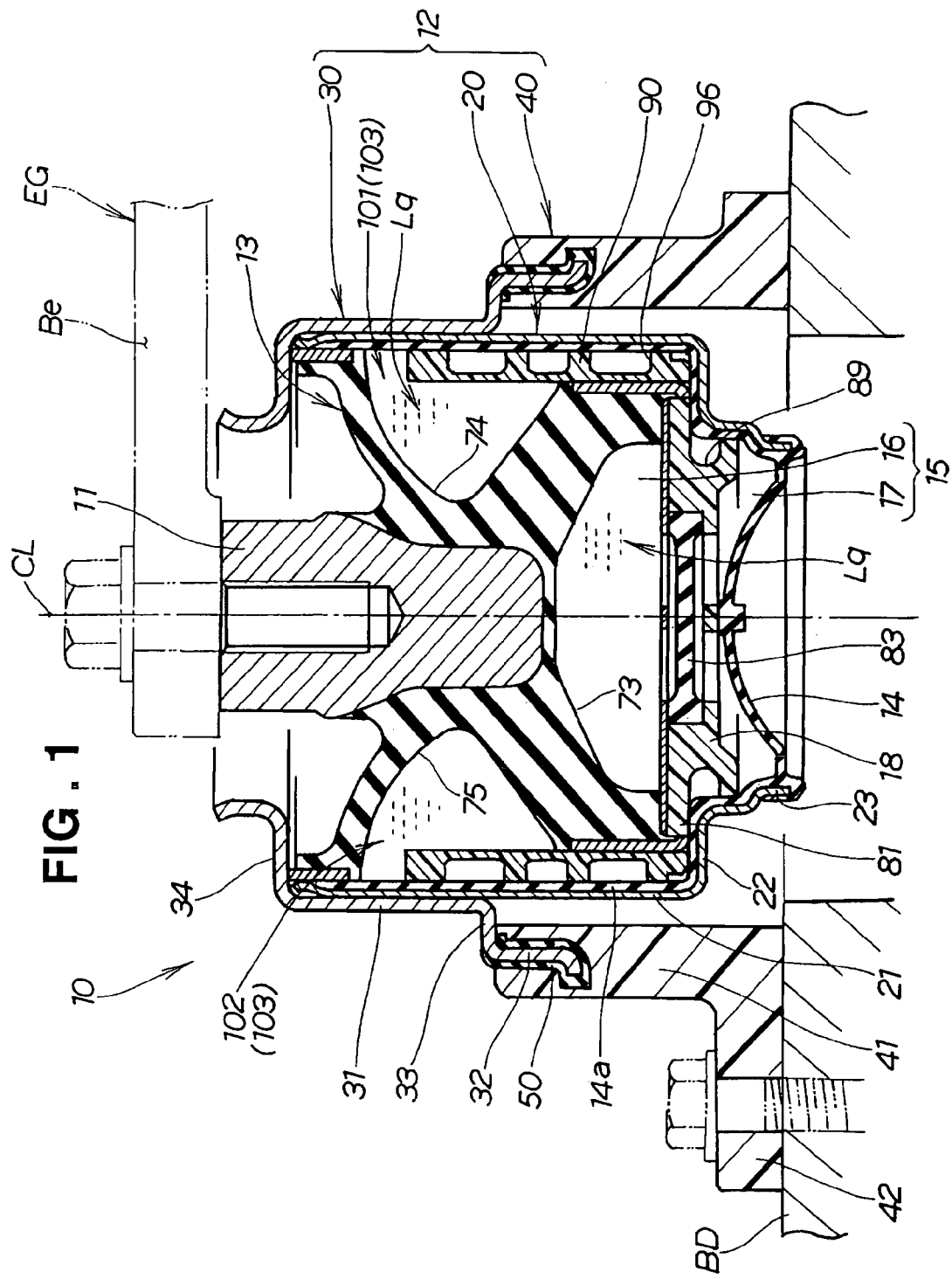
FIG. 1 is a cross-sectional view of a vibration isolation device according to a first embodiment of the present invention.

Referring now to the drawings and FIG. 1 in particular, there is shown in cross section a vibration isolation device 10 according to a first embodiment of the present invention. The vibration isolation device 10 in the illustrated embodiment is disposed between a body BD (as a support body) of a motor vehicle and an engine EG (as a vibratory source) of the motor vehicle for supporting the engine EG on the vehicle body BD in such a manner that vibration generated from the engine EG while running can be efficiently absorbed by the vibration isolation device 10 to thereby suppress transmission of the vibration from the engine EG to the support body BD. The illustrated vibration isolation device 10 is of the liquid-filled type.

Figure 2:
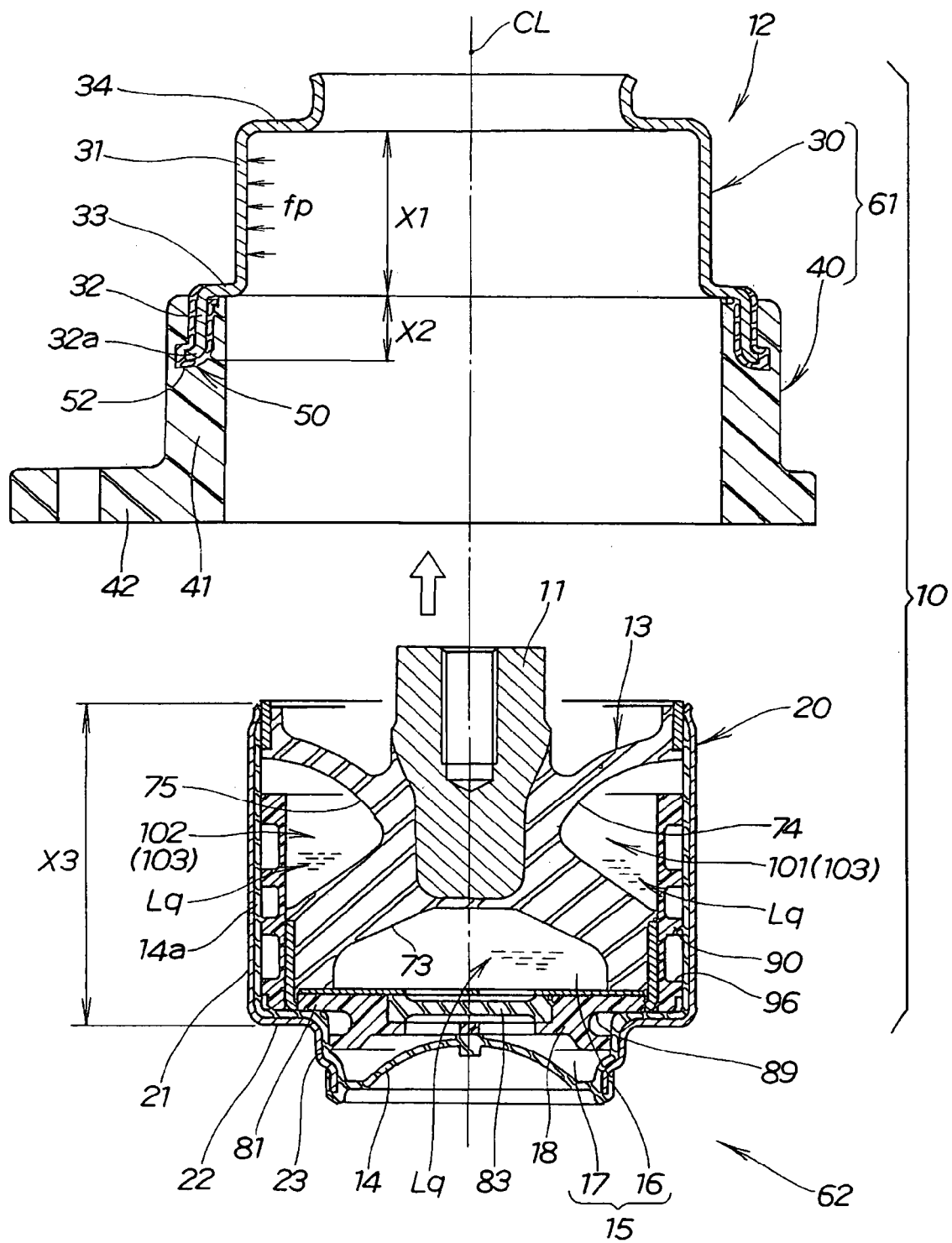
FIG. 2 is an exploded cross-sectional view of the vibration isolation device.

As shown in FIGS. 1 and 2, the liquid-filled vibration isolation device 10 generally comprises a first attachment member 11 for attachment to the engine EG, a second attachment member 12 of tubular shape for attachment to the vehicle body BD, an elastic member 13 interconnecting the first and second attachment members 11 and 12, a diaphragm 14 secured to the second attachment member 12 so as to define together with the elastic member 13 a first liquid chamber 15, and a partition member 18 secured to the second attachment member 12 in such a manner as to separate the first liquid chamber 15 into a main liquid compartment 16 on a side of the elastic member 13 and an auxiliary liquid compartment 17 on a side of the diaphragm 14.

The first and second attachment members 11, 12, elastic member 13, diaphragm 14, first liquid chamber 15 and partition member 18 are disposed coaxially with one another along a common axis CL of the vibration isolation device 10. The main liquid compartment 16 and the auxiliary liquid compartment 17 are filled with a working fluid Lq The first attachment member 11 of the vibration isolation device 10 is a stud-like member made of metal and adapted to be attached to the engine EG via an engine bracket Be. The second attachment member 12 comprises a metal tubular member 20 connected to the elastic member 13, a metal bracket 30 in which the metal tubular member 20 is press-fitted, and a plastic bracket 40 supporting the metal bracket 30 and adapted to be attached to the vehicle body BD. The elastic member 13 comprises a rubber block and hence is elastically deformable to absorb vibration transmitted between the first attachment member 11 and the second attachment member 12.

The metal tubular member 20 of the second attachment member 12 is made, for example, of steel or aluminum alloy and has a tubular shape or configuration. The structure of the metal tubular member 20 will be described below in greater detail. The plastic bracket 40 is molded of synthetic resin and includes a tubular body 41 and a plurality of mounting flanges 42 (only one being shown) formed integrally with and extending radially outward from one end (lower end in FIG. 1) of the tubular body 41. Each mounting flange 42 is bolted to the vehicle body BD.

The metal bracket 30 is a tubular member of steel or aluminum alloy and includes a tubular engagement portion 31, a tubular non-engagement portion 32 connected at one end to an end of the tubular engagement portion by an annular connecting portion 33, and an annular stopper portion 34 extending from an opposite end of the engagement portion 31 in a radial inward direction. The tubular engagement portion 31 is in press-fitted engagement with the metal tubular member 20, while the tubular non-engagement portion 32 is offset from the engagement portion 31 in a radial outward direction and held out of press-fitted engagement with the metal tubular member 20. The stopper portion 34 is in abutment with an end of the metal tubular member 20 to prevent removal of the latter from the metal bracket 30.

The metal bracket 30 is press-formed from a metal sheet or pipe of uniform thickness into a desired configuration and is slightly deformable elastically in a radial direction. The stopper portion 34, engagement portion 31, connecting portion 33 and non-engagement portion 32 are arranged in the named order along the axis CL of the vibration isolation device 10 when viewed in a direction from the engine EG toward the vehicle body BD. The connecting portion 33 forms an annular step integral with and extending between the engagement portion 31 and the non-engagement portion 32. The connecting portion or step 33 lies in a plane perpendicular to the axis CL of the vibration isolation device 10. The non-engagement portion 32 has an inside diameter larger than an inside diameter of the engagement portion. As shown in FIG. 2, an axial length X1 of the engagement portion 31 is larger than an axial length X2 of the non-engagement portion 32. More particularly, X1 is about two times X2.

The non-engagement portion 32 of the metal bracket 30 is connected to the plastic bracket 40 with an elastic member 50 disposed therebetween. More particularly, the non-engagement portion 32 is coated on its entire surface (i.e., inner and outer surfaces) with a rubber layer (elastic member) 50 having a uniform thickness. The thus coated non-engagement portion 32 is then formed integrally with the plastic bracket 40 as the latter is molded from a synthetic resin. The rubber-coated non-engagement portion 32 of the metal bracket 30, which forms a proximal end portion of the metal bracket 30, is embedded in a distal end portion (upper end portion in FIGS. 1 and 2) of the tubular body 41 of the plastic bracket 40. The rubber layer (elastic member) 50 may be attached by coating, molding, bonding or baking to the non-engagement portion 32. The connecting portion 33 of the metal bracket 30 is exposed on an end face (upper end face in FIGS. 1 and 2) of the plastic flange 40 and the engagement portion 31 projects axially outward from the connecting portion or step 33 toward the engine EG.

An inner end of the non-engagement portion 32 is bent in a radial outward direction so as to form a stopper flange 32a (FIG. 2) for anchoring the non-engagement portion 32 in position against removal from the plastic bracket 40.

As previously described, the metal bracket 30 and the plastic bracket 40 are connected together by integral molding so that they jointly form a first subassembly 61 (FIG. 2).

The stopper portion 34 is formed as a result of constriction effected at a free end (upper end in FIG. 2) of the metal bracket 30.

As shown in FIGS. 2 and 3, the metal tubular member 20 includes a first tubular portion 21 and a second diameter portion 23 smaller in diameter than the first tubular portion 21 and connected to the first tubular portion 21 by an annular step portion 22. The metal tubular member 20 is press-formed from a metal sheet or pipe having a uniform thickness. The first tubular portion 21 receives therein the elastic member 13 for attachment thereto and is press-fit with the tubular engagement portion 31 of the metal bracket 31 (FIG. 2). The second tubular portion 23 is provided for mounting the diaphragm 14 and the partition member 18.

The diaphragm 14 is formed from a thin film of elastic material such as rubber and mounted so as to close an end (lower end in FIG. 3) of the second tubular portion 23 facing the vehicle body BD (FIG. 1). The diaphragm 14 is convexly curved toward the partition member 18 and elastically deformable in the axial direction of the vibration isolation device 10 (FIG. 1). The diaphragm 14 has an outer edge formed integrally with an end of a tubular seal or lining 14a coated on an inner surface of the metal tubular member 20 over substantially the entire area thereof. The lining 14a is a thin film of uniform thickness and attached to the inner surface of the metal tubular member 20 by integral molding or baking. By thus attaching the lining 14a to the metal tubular member 20, the diaphragm 14 forms an integral bottom part of the metal tubular member 20 of a generally cup-like configuration The metal tubular member 20 having the diaphragm 14 attached thereto is assembled with the partition member 18, a side partition member 90 (described later) and the elastic member 13 that are placed in the metal tubular member 20 in the named order. Then, an upper end of the metal tubular member 20 is narrowed or constricted to thereby hold or retain these members 18, 90, 13 inside the metal tubular member 20. The partition member 18, side partition member 90, elastic member 13 and metal tubular member 20 thus assembled together form a second subassembly 62 (FIG. 2). The second subassembly 62 and the first subassembly 61 are then assembled together by forcing the first tubular portion 21 of the metal tubular member 20 into press-fitted engagement with the tubular engagement portion 31 of the metal bracket 30 until the first tubular portion 21 comes in abutment with the annular stopper portion 34. A vibration isolation device, such as the one 10 shown in FIG. 1, is thus produced.

As shown in FIG. 2, the first tubular portion 21 of the metal tubular member 20 has an axial length X3 larger than the axial length X1 of the engagement portion 31 of the metal bracket 30 (in the illustrated embodiment, X3 is about two times X1) so that a lower part of the first tubular portion 21 remains out of press-fitted engagement with the engagement portion 31 and is accommodated within an internal space of the plastic bracket 40. In an assembled condition of the vibration isolation device 10, an outer end (lower end in FIG. 1) of the metal tubular member 20 lies substantially flush with an end face of each mounting flange 42. The non-engagement portion 32 of the metal bracket 30 overlaps the metal tubular member 20 in the axial direction of the vibration isolation device 10 but is spaced a distance from the metal tubular member 20 in the radial direction of the vibration isolation device 10, which is perpendicular to the axis CL of the vibration isolation device 10.

As thus far described, that part of the second attachment portion 12 which is used for attachment to the vehicle body BD (support body) is formed by a plastic bracket 40. This arrangement contributes to reduction of the overall weight of the vibration isolation device 10. Furthermore, since the non-engagement portion 32 of the metal bracket 30 is connected to the plastic bracket 40 with the elastic rubber member 50 disposed therebetween, an external force fp (FIG. 2) acting on the engagement portion 31 in a radial outward direction when the metal tubular member 20 is press-fitted into the engagement portion 31 of the metal bracket 30 can be absorbed and effectively suppressed by the non-engagement portion 32 and the elastic rubber member 50 such that the external force fp is not transmitted to the plastic bracket 40. The external force fp gives no effect on the plastic bracket. Additionally, by virtue of elastic supporting of the non-engagement portion 32 by the rubber member 50, a force or pressure necessary for forcing the tubular metal member 20 into the engagement portion 31 of the metal bracket 30 can be increased to such an extent as to ensure reliable press-fitted engagement between the tubular metal member 20 and the metal bracket 30. By using the press-fitting operation, it is possible to assemble the first subassembly 61 (composed of the metal bracket 30 and the plastic bracket 40 connected together) and the second subassembly 62 (composed of the elastic member 13, partition members 18, 19 and metal tubular member 20 assembled together) with utmost ease and increased efficiency.

As shown in FIG. 1, the tubular non-engagement portion 32 of the metal bracket 30 is offset in a radial outward direction from the engagement portion 31 so that the non-engagement portion 32 and the metal tubular member 20 overlap with each other in the axial direction of the vibration isolation device 10 but are spaced from each other in the radial direction of the vibration isolation device 10. The engagement portion 31 and the non-engagement portion 32 are integrally connected together by the annular connecting portion or step 33, which lies in a plane perpendicular to the axis CL of the vibration isolation device 10. The thus arranged connecting portion 33 also serves to suppress the external force fp (FIG. 2) acting on the engagement portion 31 during press-fitting operation. This provides additional effects on the protection of the plastic bracket 40 against damage or rupturing.

Figure 4A:
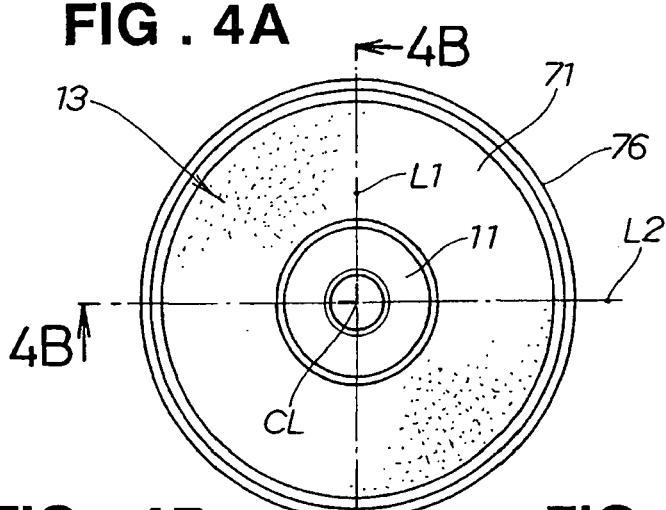
FIG. 4A is a plan view of the elastic member.
Figure 4B:
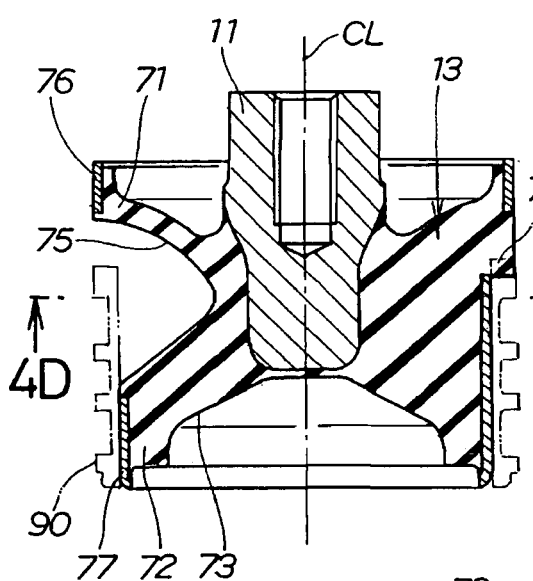
FIG. 4B is a cross-sectional view taken along line 4B-4B of FIG. 4A.
Figure 4C:
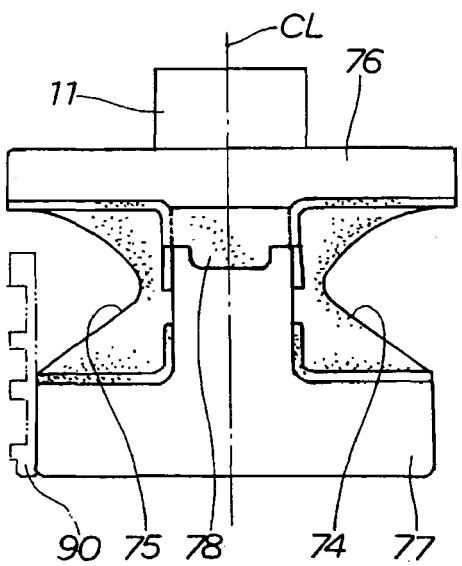
FIG. 4C is a view in a direction of the arrow 4C of FIG. 4A.
Figure 4D:
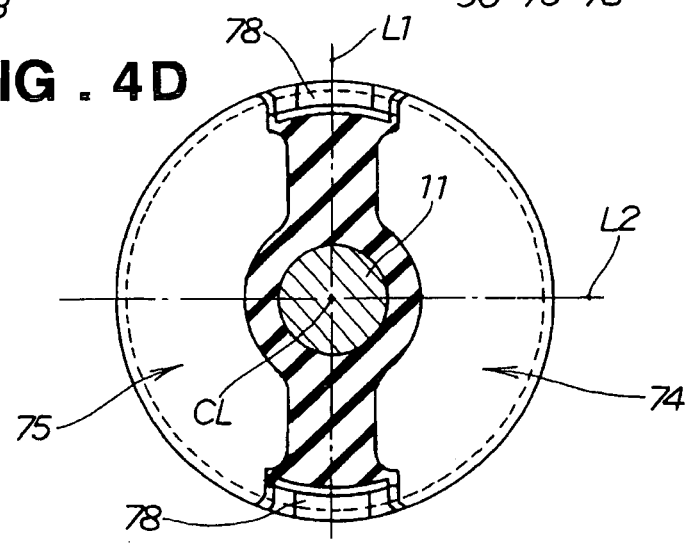
FIG. 4D is a cross-sectional view taken along line 4D-4D of FIG. 4B.

Description will be next made to the elastic member 13 shown in FIGS. 4A to 4D. As shown in these figures, the elastic member 13 is generally hourglass-shaped and has an upper end portion 71 integrally connected to the first attachment member 11 and a lower end portion 72 formed with a recess 73 of conical shape open downward. The hourglass-shaped elastic member 13 also has a pair of diametrically opposite side recesses 74, 75 of conical shape open in a radial outward direction of the elastic member 13. As shown in FIG. 4D, the side recesses 74, 75 are symmetrical with respect to a line L1 passing through the axis CL of the elastic member 13 (which is common to the axis of the vibration isolation device 10 shown in FIG. 1). An upper part of the hourglass-shaped elastic member 13 including the upper end portion 71 is larger in outside diameter than a lower part including the recessed lower end portion 72 of the elastic member 13. The elastic member 13 also has an upper metal core 76 fitted around an outer circumferential surface of the upper end portion 71 thereof, and a lower metal core 77 fitted around an outer circumferential surface of the lower end portion 72. The elastic member 13 further has a pair of diametrically opposite positioning projections or ribs 78, 78 provided on a stepped portion between the upper end portion 71 and the lower end portion 72 and extending from the upper end portion 71 toward the lower end portion 72. The positioning ribs 78 are aligned with each other along the line L1.

Referring next to FIGS. 5A to 5D, the partition member 18 includes a hollow disk-like body 18a (FIG. 5B) molded of synthetic resin and having an annular flange 81 at an upper end thereof, an elastic partition plate 83 made, for example, of rubber and fitted in a central recessed portion 82 of the body 18a, and a cover plate 84 placed over the elastic partition plate 83 and attached by fusion bonding to the flanged end portion of the plastic partition member body 18a. The metal cover plate 84 has a plurality (four in the illustrated embodiment) of through-holes or apertures 84a facing the elastic partition plate 83.

When the partition member 18 is assembled in the vibration isolation device 10 as shown in FIG. 1, the elastic partition plate 83 faces the main liquid compartment 16 and the auxiliary liquid compartment 17. The elastic partition plate 83 is elastically deformable in an axial direction thereof to thereby absorb a change in the internal pressure of the main or auxiliary liquid compartment 16, 17 and also can improve dynamic response of the vibration isolation device 10 against vibrations in a medium frequency range.

Figure 5A:
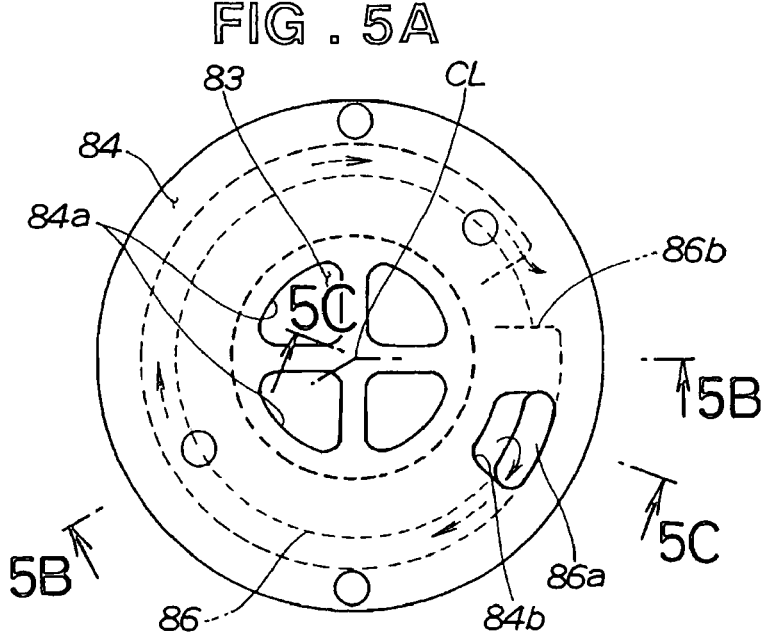
FIG. 5A is a plan view of the partition member.
Figure 5B:
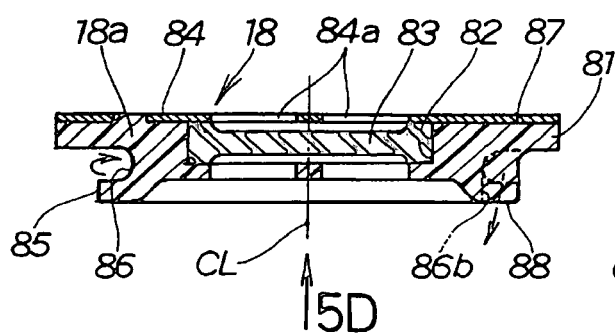
FIG. 5B is a cross-sectional view taken along line 5B-5B of FIG. 5A.
Figure 5C:
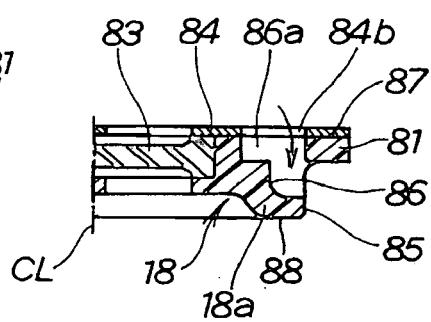
FIG. 5C is a cross-sectional view taken along line 5C-5C of FIG. 5A.
Figure 5D:
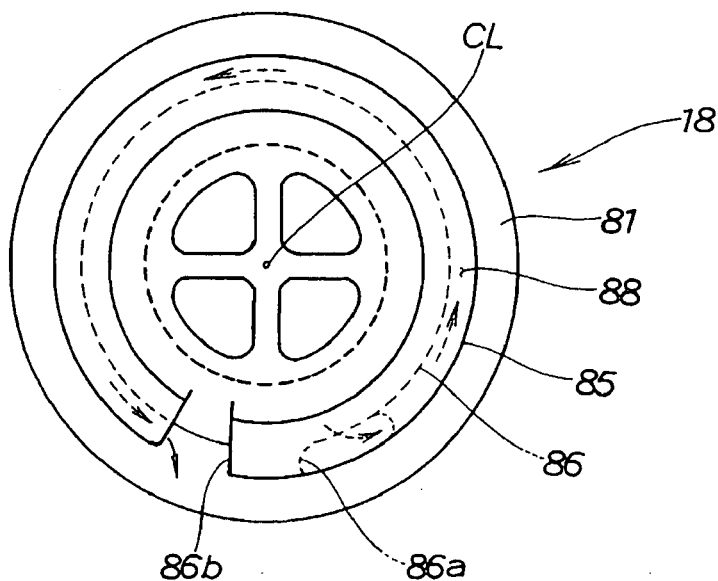
FIG. 5D is a bottom view of the partition member in the direction of arrow 5D of FIG. 5B.

The partition member 18 has a circumferential groove 86 formed in an outer circumferential surface 85 (FIG. 5B) of the plastic body 18a. As best shown in FIG. 5C, the groove 86 has one end 86a which communicates through an end face 87 of the flanged end portion of the plastic body 18a with an opening 84b formed in the metal cover plate 84. From the one end 86a thereof the groove 86 extends clockwise in FIG. 5A along the outer circumferential surface 85 over an angle of approximately 315 degrees and terminates in an opposite end 86b. The opposite end 86b of the groove 86 opens to a lower end face 88 of the plastic body 18a of the partition member 18, as shown in FIG. 5C.

The partition member 18 of the foregoing configuration is assembled with the metal tubular member 20 (FIG. 3) equipped with the diaphragm 14 in a manner as described below. For assembly, the partition member 18 is first placed in the metal tubular member 20 from above, and then forced downward until the flange 81 at the upper end of the partition member 18 is seated on the annular step portion 22 of the metal tubular member 20, as shown in FIG. 2. During that time, the outer circumferential surface 85 of the partition member 18 is brought into pressure contact with the elastic rubber lining 14a coated on the inner surface of the metal tubular member 20. By virtue of the elasticity of the rubber lining 14a, there is provided, between the circumferential surface 85 of the partition member 18 and the lining 14a, a hermetic seal, which closes an open outer side of the circumferential groove 86 (FIG. 3) formed in the circumferential surface 85. The thus closed groove 86 forms a connecting passage 89 communicating at one end with the main liquid compartment 16 defined between the partition member 18 and the recess 73 of the elastic member 13 and, at the other end, with the auxiliary liquid compartment 17 defined between the partition member 18 and the diaphragm 14. The connecting passage 89 communicating between the main and auxiliary liquid compartments 16 and 17 operates similarly to an orifice and accordingly this passage 89 will be referred to as "a first orifice".

Figure 6A:
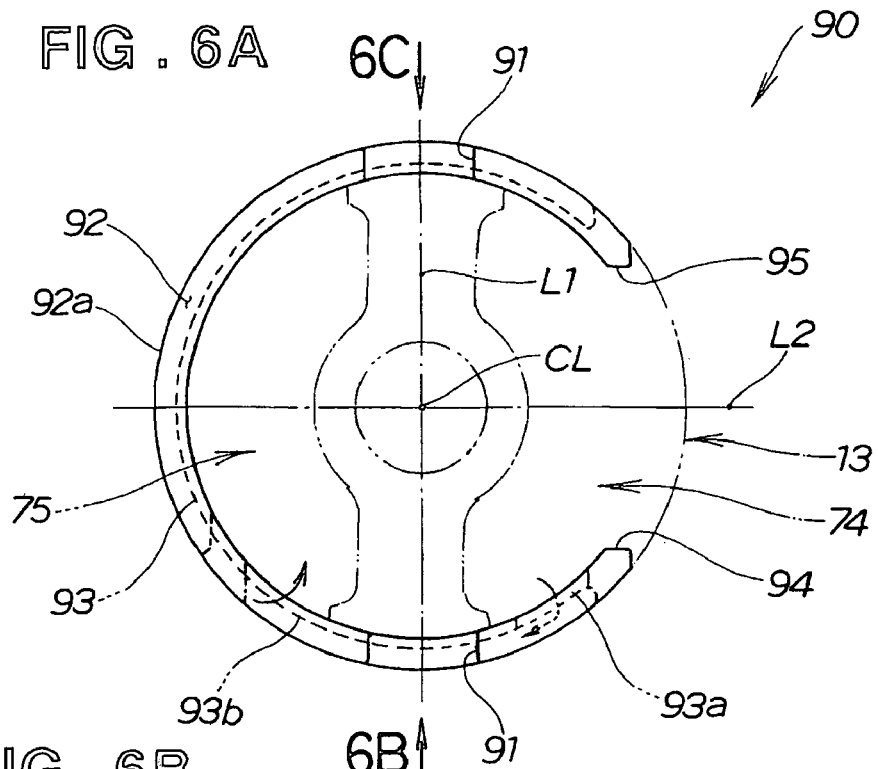
FIG. 6A is a plan view of the side partition member.
Figure 6B:
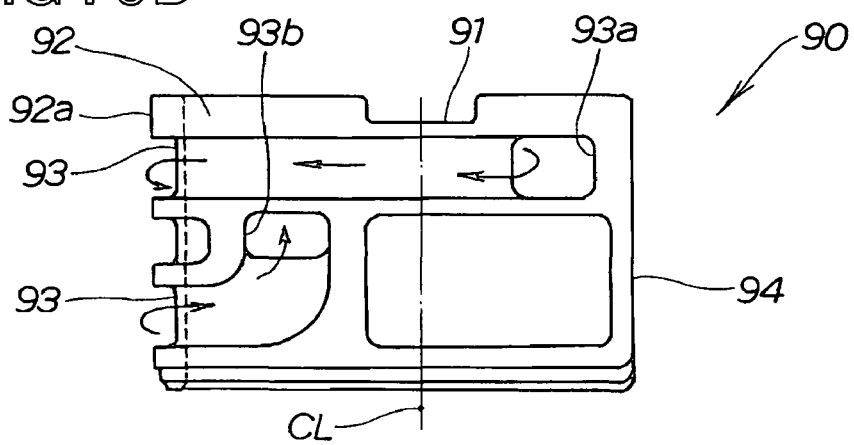
FIG. 6B is a side view in a direction of the arrow 6B of FIG. 6A.
Figure 6C:
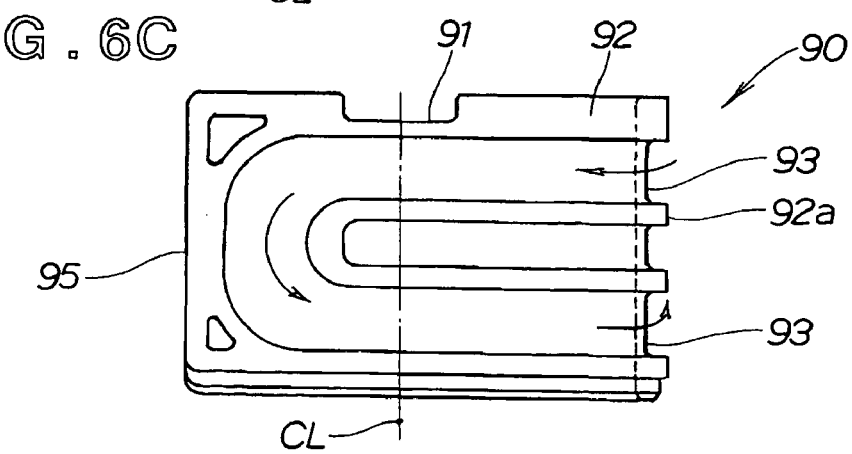
FIG. 6C is a side view in a direction of the arrow 6C of FIG. 6A.

Referring next to FIGS. 6A to 6C, the side partition member 90 comprises a split sleeve molded of synthetic resin and has a generally C-shaped cross section. The thus shaped side partition member 90 can be snap-fit over the lower end portion of the elastic member 13 while keeping a necessary degree of fluid-tightness therebetween, as shown in FIGS. 4B and 4C. For proper attachment to the elastic member 13, the side partition member 90 has a pair of diametrically opposite cutout recesses 91, 91 formed in an upper end portion thereof. As shown in FIG. 6A, the cutout recesses 91 are located on a line L1 passing through the common axis CL when an open side of the C-shaped sleeve-line side partition member 90 is aligned with a line L2 passing through the common axis CL and perpendicular to the line L1. The side partition member 90 is snap-fit over the lower end portion 72 of the elastic member 13 with the cutout recesses 91 snuggly receiving therein the respective positioning ribs 78 (FIG. 4C) of the elastic member 13. The side partition member 90 is thus positioned in the circumferential direction relative to the elastic member 13.

As shown in FIGS. 6B and 6C, the split sleeve-like side partition member 90 has a continuous groove 93 formed in a labyrinthine pattern in an outer circumferential surface 92a of a sidewall 92 thereof. The labyrinthine groove 93 is connected at one end to a through-hole or opening 93a (FIG. 6B) formed in the sidewall 92 adjacent to the upper end of the side partition member 90. The opening 93a is located near one of opposite open longitudinal edges 94 of the split sleeve-like side partition member 90. The other end of the labyrinthine groove 93 is connected to a through-hole or opening 93b (FIG. 6B) formed in the sidewall 92 and located obliquely downward of the opening 93a. When viewed in the direction of the arrow 6B shown in FIG. 6A, the two openings 93a and 93b are disposed on opposite sides of a vertical plan passing though the common axis CL and aligned with the cutout recesses 91 of the side partition member 90. The groove 93 has a labyrinthine pattern, which starts from the opening 93a located adjacent to one longitudinal edge 94 of the side partition member 90, advances continuously in a circumferential direction (clockwise direction in FIG. 6A) along the sidewall 92, then makes a U-turn along an opposite open longitudinal edge 95 of the partition member 90, further extends in the opposite circumferential direction along the sidewall 92, and finally terminates at the opening 93b.

The side partition member 90 of the foregoing construction is assembled by snap-fitting with the elastic member 13 in the manner as discussed above. The thus assembled side partition member 90 and the elastic member 13 are then placed in the metal tubular member 20 from above, and subsequently forced downward until the lower ends of these members 90, 13 come into abutment with the annular step portion 22, as shown in FIG. 2. During that time, the outer circumferential surface 92 of the side partition member 90 is brought into pressure contact with the elastic rubber lining 14a coated on the inner surface of the metal tubular member 20. By virtue of the elasticity of the rubber lining 14a, there is provided, between the outer circumferential surface 92 of the side partition member 90 and the lining 14a, a hermetic seal, which closes an open outer side of the labyrinthine groove 93 (see FIG. 3) formed in the outer circumferential surface 92.

The thus closed groove 93 forms a labyrinthine connecting passage 96 (FIG. 2) communicating through the opening 93a at one end thereof with a first side liquid compartment 101 defined between the side partition member 90 and the side recess 74 of the elastic member 13 and, through the opening 93b at the opposite end thereof, with a second side liquid compartment 102 defined between the side partition member 90 and the side recess 75 of the elastic member 13. The first and second side liquid compartments 101, 102 together form a second liquid chamber 103 in which the working fluid Lq is retained. The labyrinthine connecting passage 96 communicating between the first and second side liquid compartments 101 and 102 operates similarly to an orifice and accordingly this passage 96 will be referred to as "a second orifice".

The vibration isolation device 10 of the foregoing construction operates as follows. When the vibration isolation device 10 shown in FIG. 1 is subjected to vibration from the engine EG acting in an axial direction parallel to the common axis CL of the vibration isolation device 10, the elastic member 13 undergoes elastic deformation in the axial direction, urging the working fluid Lq to pass through the first orifice 89 between the main and auxiliary liquid compartments 16 and 17. By virtue of a damping effect attained by the elastic deformation in the axial direction of the elastic member 13 and a restricted flow of the working fluid Lq created by the first orifice 89 in combination, the axial vibration from the engine EG can be effectively suppressed before being transmitted to the vehicle body BD.

When the vehicle rolls, the vibration from the engine EG may act on the vibration isolation device 10 in a direction perpendicular to the direction of the axis CL. In this instance, the elastic member 13 undergoes elastic deformation in a lateral direction perpendicular to the common axis CL, urging the working fluid Lq to flow through the second orifice 96 between the first and second side liquid compartments 101 and 102 of the second liquid chamber 103. By virtue of a damping effect attained by the elastic deformation in the lateral direction of the elastic member 13 and a restricted flow of working fluid created by the second orifice 96 in combination, the vibration from the engine EG in the lateral direction (i.e., the direction perpendicular to the axis CL of the vibration isolation device 10) can be effectively suppressed before being transmitted to the vehicle body BD.

Figure 7:
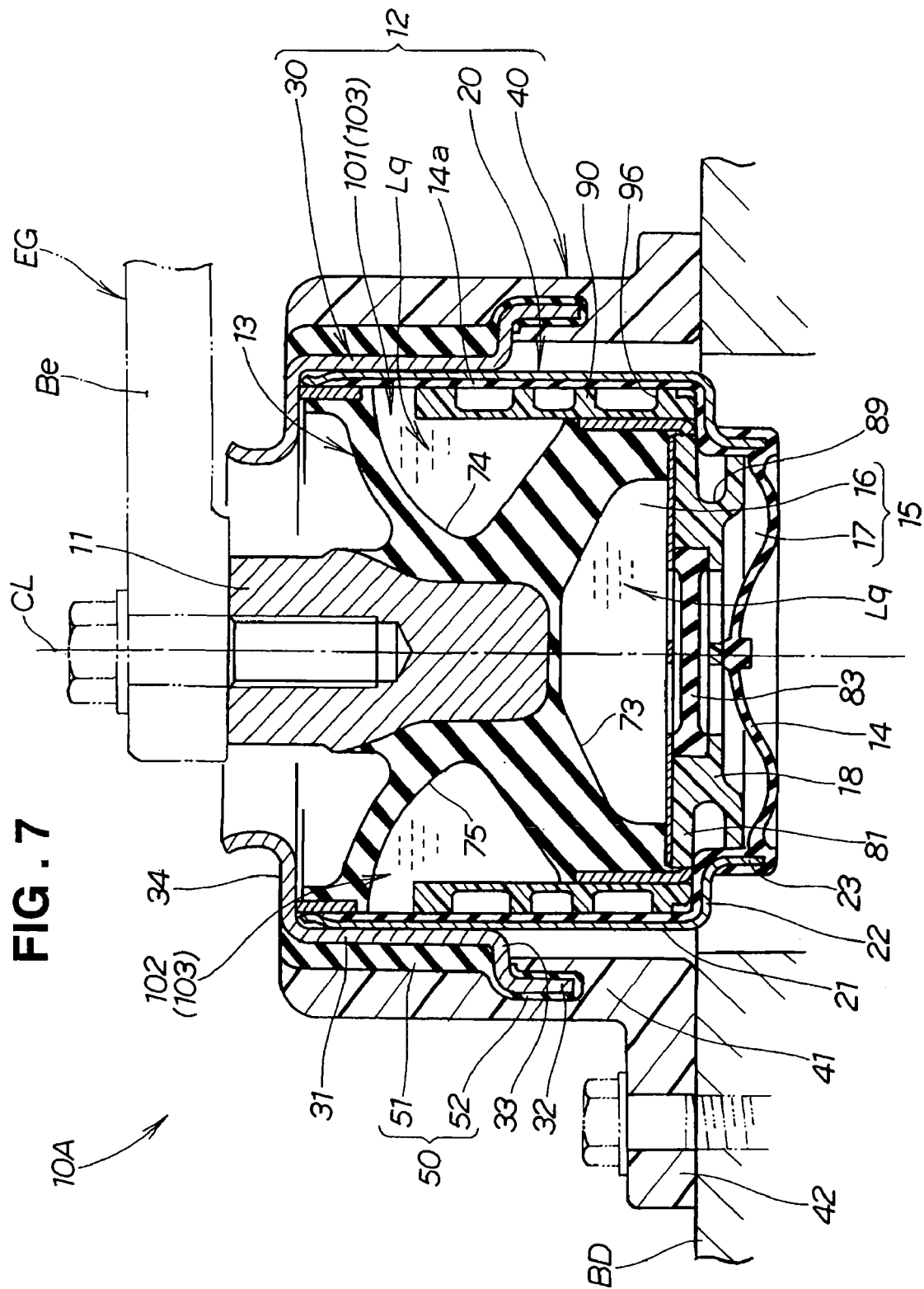
FIG. 7 is a cross-sectional view of a vibration isolation device according to a second embodiment of the present invention.
Figure 8:
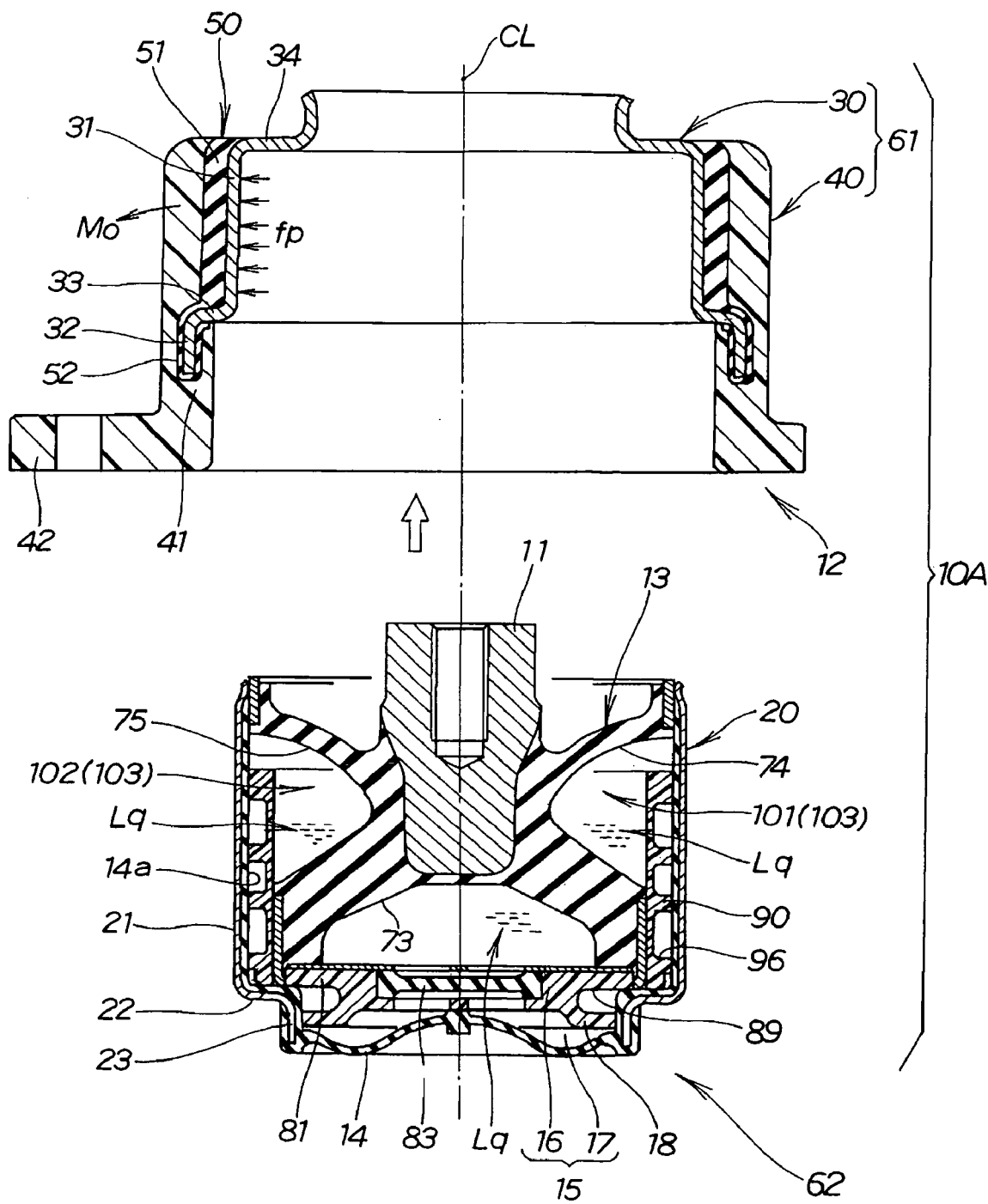
FIG. 8 is an exploded cross-sectional view of the vibration isolation device of FIG. 7.

FIG. 7 shows in cross section a vibration isolation device 10A according to a second embodiment of the present invention. FIG. 8 is an exploded view of the vibration isolation device 10A. The vibration isolation device 10A in this embodiment differs from the device 10 in the first embodiment shown in FIG. 1 only in that the engagement portion 31 of the metal bracket 30 is elastically supported from a radial outward direction by means of an elastic rubber member 50 disposed between the engagement portion 31 and the tubular body 41 of the plastic bracket 40. Other parts of the vibration isolation device 10A are the same as those of the device 10 shown in FIG. 1 and, hence, like reference characters designate the same or corresponding parts throughout the several views.

As shown in FIGS. 7 and 8, the tubular body 41 of the plastic bracket 40 is axially elongated in an upward direction to the extent that an upper end of the thus elongated body 40 lies substantially flush with the annular stopper portion 34 of the metal bracket 30. The elastic member 50 is also elongated upwards until an upper end thereof lies substantially flush with the stopper portion 34 of the metal bracket 30. The elastic member 50 includes an upper portion 51 of a tubular shape disposed between the engagement portion 31 of the metal bracket 30 and an upper part of the tubular body 41 of the plastic bracket 40, and a lower portion 52 coated on the inner and outer surfaces of the non-engagement portion 32 of the metal bracket 30 and embedded in a lower part of the tubular body 41 of the plastic bracket 40. Preferably, the upper portion 51 of the elastic member 50 is about three to five times larger in thickness than the lower portion 52. In the second embodiment shown in FIG. 7, the inner end (lower end in FIG. 1) of the metal bracket 30 is not bent in a radial outward direction so as to form a stopper flange 32*a* (FIG. 2) as in the case of the first embodiment shown in FIG. 1.

Additional to those attained by the device 10 in the first embodiment shown in FIG. 1, the vibration isolation device 10A of the second embodiment can achieve further advantageous effects as will be discussed below.

When the metal tubular member 20 is press-fitted in the metal bracket 30, as shown in FIG. 8, the engagement portion 31 of the metal bracket 30 is subjected to an external force or pressure fp acting in a radial outward direction of the metal bracket 30. In this instance, however, the upper portion 51 of the elastic member 50 disposed between the engagement portion 31 and the tubular body 41 of the plastic bracket 40 can effectively absorb the external force fp to thereby suppress a moment Mo which may occur at the tubular body 41 of the plastic bracket 40 due to transmission of the external force fp through the engagement portion 31 and non-engagement portion 32 of the metal bracket 30. With this enhanced force-suppressing effect, the plastic bracket 40 is kept substantially free from damage or rupturing during press-fitting operation.

The vibration isolation device 10, 10A of the present invention should by no means be limited to the liquid-filled engine mount as in the illustrated embodiments but may be employed in any other form provided that the vibration isolation device is disposed between a vibratory source and a support body on which the vibratory source is mounted via the vibration isolation device. Furthermore, in the illustrated embodiments, the second attachment member 12 of the vibration isolation device 10, 10A is attached to the vehicle body BD (support body). The second attachment member 12 may be attached to the engine EG (vibratory source) in which instance the first attachment portion 11 is attached to the vehicle body BD (support body).

With the arrangements so far described, the present invention can be used advantageously as a vibration isolation device for an FF (front-engine front-drive) vehicle, which is disposed between a front portion of the engine and a front portion of the vehicle body for absorbing vibration generated from the engine while supporting the engine on the vehicle body.

Obviously, various minor changes and modifications of the present invention are possible in the light of the above teachings. It is therefore to be understood that within the scope of the appended claims the invention may be practiced otherwise than as specifically described.

What is claimed is:

1. A vibration isolation device comprising:
   a first attachment member for attachment to a vibratory source;
   a second attachment member for attachment to a support body on which the vibratory source is to be mounted via the vibration isolation device; and
   an elastic member interconnecting the first attachment member and the second attachment member,
   wherein one of the first attachment member and the second attachment member comprises a metal tubular member connected to the elastic member, a metal bracket in which the metal tubular member is press-fitted, and a plastic bracket supporting the metal bracket and adapted to be attached to the vibratory source or the support body,
   wherein the metal bracket has an engagement portion press-fitted with the metal tubular member, and a non-engagement portion offset from the engagement portion in a radial outward direction and held out of press-fitted engagement with the metal tubular member, the non-engagement portion being connected to the plastic bracket with a second elastic member disposed therebetween, and
   wherein the elastic member is disposed entirely within the hollow interior of the metal tubular member.

2. The vibration isolation device according to claim 1, wherein the metal bracket and the second elastic member are integrally molded with the plastic bracket such that the non-engagement portion of the metal bracket is coated with the second elastic member and embedded together therewith in the plastic bracket.

3. The vibration isolation device according to claim 2, wherein the second elastic member includes a first portion coated on the non-engagement portion of the metal bracket and embedded in the plastic bracket, and a second portion integral with the first portion and disposed between the engagement portion of the metal bracket and the plastic bracket.

4. The vibration isolation device according to claim 3, wherein the second portion of the second elastic member has a larger thickness than the first portion of the second elastic member.

5. The vibration isolation device according to claim 2, wherein the second elastic member is coated on inner and outer surfaces of the non-engagement portion.

6. The vibration isolation device according to claim 1, wherein the non-engagement portion has an end bent in a radial direction of the metal bracket so as to form a stopper flange for anchoring the non-engagement portion in position against removal from the plastic bracket.

7. The vibration isolation device according to claim 1, wherein the metal bracket further includes an annular step integral with and extending between the engagement portion and the non-engagement portion of the metal bracket, the annular step lying in a plane perpendicular to an axis of the metal bracket.

8. The vibration isolation device according to claim 2, wherein the metal bracket, the second elastic member and the plastic bracket are connected in a first sub-assembly, the metal tubular member is connected to the elastic member in a second sub-assembly, and the first and second sub-assemblies are connected as the vibration device by press-fitting the metal tubular member in the metal bracket.

9. The vibration isolation device according to claim 1, wherein the metal tubular member is a hollow cylinder.

10. The vibration isolation device according to claim 1, wherein the metal tubular member has a generally cylindrical shape, the metal tubular member comprising:
    a first end press-fitted within the engagement portion of the metal bracket, the first end having a first diameter, and
    a second end having a second diameter which is less than the first diameter,
    wherein the metal tubular member is of a length such that the second end does not reside within the engagement portion of the metal bracket.

11. The vibration isolation device according to claim 1, wherein the metal tubular member is a hollow cylinder closed at the second end by an elastic diaphragm.

12. The vibration isolation device according to claim 11, wherein the diaphragm comprises a lining portion which coats the inner surface of the metal tubular member, and a deformable portion which closes the second end of the metal tubular member, wherein the deformable portion is convexly curved toward the first end of the metal tubular member and is elastically deformable in the axial direction of the metal tubular member.

13. The vibration isolation device according to claim 1, wherein the elastic member is connected to the metal tubular member at an outer peripheral surface of the elastic member, and is connected to the other one of the first attachment member and the second attachment member at one end of, and along an axial centerline of, the elastic member.

14. The vibration isolation device according to claim 1, wherein the elastic member is comprises an hour-glass shape such that opposed axial ends of the elastic member have a greater diameter than a central portion of the elastic member, and wherein the central portion of the elastic member comprises diametrically opposed first and second side recesses opening in a radially outward direction of the elastic member along a first diameter, the first and second side recesses are separated by a pair of diametrically opposed first and second ribs extending along a second diameter, the first and second diameters are mutually perpendicular.

15. The vibration isolation device according to claim 14, wherein the elastic member further comprises a sleeve having a c-shaped cross section, the sleeve configured to snap-fit about one axial end of the elastic member, the sleeve comprising an outer peripheral surface having a continuous groove formed in a labyrinthine pattern thereon, and wherein the elastic member is received within an interior of the metal tubular member such that the outer peripheral surface of the sleeve confronts an inner peripheral surface of the metal tubular member whereby the inner peripheral surface of the metal tubular member cooperates with the groove to form a fluid communication passage, and a first end of the fluid communication passage communicates with the first side recess and a second end of the fluid communication passage communicates with the second side recess so as to permit fluid flow between the first and second side recesses.

\* \* \* \* \*